United States Patent
Kasahara et al.

(10) Patent No.: US 10,136,094 B2
(45) Date of Patent: Nov. 20, 2018

(54) DISPLAY APPARATUS AND METHOD FOR CONTROLLING DISPLAY APPARATUS

(71) Applicant: Seiko Epson Corporation, Tokyo (JP)

(72) Inventors: Daisuke Kasahara, Shiojiri (JP); Takashi Otome, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 574 days.

(21) Appl. No.: 14/631,115

(22) Filed: Feb. 25, 2015

(65) Prior Publication Data

US 2015/0249804 A1   Sep. 3, 2015

(30) Foreign Application Priority Data

Feb. 28, 2014   (JP) ................................. 2014-038272

(51) Int. Cl.
| | |
|---|---|
| *H04N 5/44* | (2011.01) |
| *G09G 5/00* | (2006.01) |
| *H04N 21/4363* | (2011.01) |
| *H04N 21/442* | (2011.01) |

(52) U.S. Cl.
CPC ........... *H04N 5/4401* (2013.01); *G09G 5/006* (2013.01); *H04N 21/43635* (2013.01); *H04N 21/44227* (2013.01); *G09G 2330/02* (2013.01); *G09G 2370/12* (2013.01); *G09G 2370/20* (2013.01); *G09G 2370/22* (2013.01)

(58) Field of Classification Search
None
See application file for complete search history.

(56) References Cited

U.S. PATENT DOCUMENTS

| | | | | |
|---|---|---|---|---|
| 2010/0103272 | A1* | 4/2010 | Yagi | G09G 5/006 348/192 |
| 2012/0080954 | A1* | 4/2012 | Gachon | G06F 3/14 307/80 |
| 2013/0021439 | A1 | 1/2013 | Tao et al. | |
| 2013/0308015 | A1 | 11/2013 | Aokage | |
| 2015/0019761 | A1* | 1/2015 | Suda | G09G 5/006 710/16 |
| 2015/0222822 | A1* | 8/2015 | Bartholomew | G06F 13/4086 348/706 |

FOREIGN PATENT DOCUMENTS

| | | |
|---|---|---|
| JP | 2009-130680 A | 6/2009 |
| JP | 2012-169702 A | 9/2012 |
| JP | 2013-243473 A | 12/2013 |

* cited by examiner

*Primary Examiner* — Ilwoo Park
(74) *Attorney, Agent, or Firm* — ALG Intellectual Property, LLC

(57) ABSTRACT

A display apparatus that displays an image includes a connection unit that is connected to an external apparatus and receives an image signal and a control signal from the external apparatus, a display unit that displays an image based on the image signal received by the connection unit, and a control unit that performs reconnection action of causing the connection unit to enter a first state in which the control unit recognizes that the external apparatus has not been connected to the connection unit and then causing the connection unit to enter a second state in which the control unit recognizes that the external apparatus has been connected to the connection unit.

15 Claims, 4 Drawing Sheets

DISPLAY APPARATUS AND METHOD FOR CONTROLLING DISPLAY APPARATUS

The entire disclosure of Japanese Patent Application No. 2014-038272, filed Feb. 28, 2014, is expressly incorporated by reference herein.

BACKGROUND

1. Technical Field

The present invention relates to a display apparatus and a method for controlling the display apparatus.

2. Related Art

There is a known system in which a display apparatus, such as a projector, and an electronic apparatus are connected to each other and video images and voices are transferred from the electronic apparatus to the display apparatus (see JP-A-2013-243473, for example). In the system described in JP-A-2013-243473, for example, a High Definition Multimedia Interface ("HDMI") (registered trademark) interface connects an apparatus that transmits image data to an apparatus that receives the image data.

An interface through which video images and still images are transferred between apparatus, as in the system of related art described above, advances in terms of function. For example, an HDMI interface has an HPD (hot plug detect) function, which allows a source device and a sync device to automatically detect connection between them. However, even a highly advanced interface of this type fails in connection detection or experiences an unstable connection state in some cases. In such cases, user' operation of temporarily disconnecting and then reconnecting a connection cable allows normal detection of the connection in many cases, but the operation is cumbersome.

SUMMARY

An advantage of some aspect of the invention is to provide a display apparatus including an interface that performs inter-apparatus signal transfer and capable of solving failure in connection detection and an unstable connection state without user's operation.

An aspect of the invention relates to a display apparatus that displays an image, the apparatus including a connection unit that is connected to an external apparatus and configured to receive an image signal and a control signal from the external apparatus, a display unit configured to display an image based on the image signal received by the connection unit, and a control unit configured to perform reconnection action of causing the connection unit to enter a first state in which the control unit recognizes that the external apparatus has not been connected to the connection unit and then causing the connection unit to enter a second state in which the control unit recognizes that the external apparatus has been connected to the connection unit.

According to the aspect of the invention, the display apparatus that receives an image signal and a control signal from an external apparatus can perform the reconnection action to achieve the same state as in a case where the connection is released and established again. Therefore, for example, in the case of an apparatus that is wired to an external apparatus with a cable so that the connection therebetween is detectable, the same effect as in a case where the cable is disconnected and reconnected can be provided. As a result, when the connection detection fails or when the connection becomes unstable, a normal connection state can be restored without user's operation.

In the display apparatus according to the aspect of the invention, the connection unit may include a signal reception section configured to receive the image signal, an inter-apparatus communication section configured to communicate with the external apparatus and to receive the control signal, and an electric power supply section configured to supply the external apparatus with electric power.

According to the aspect of the invention with this configuration, in the display apparatus having a function of receiving an image signal from an external apparatus, communicating with the external apparatus and transmitting and receiving other signals, and supplying the external apparatus with electric power, when the connection detection fails or when the connection becomes unstable, a normal connection state can be quickly restored.

In the display apparatus according to the aspect of the invention, the signal reception section may receive the image signal and a voice signal.

According to the aspect of the invention with this configuration, in the display apparatus having a function of receiving an image signal and a voice signal from an external apparatus and supplying the external apparatus with electric power, when the connection detection fails or when the connection becomes unstable, a normal connection state can be quickly restored.

In the display apparatus according to the aspect of the invention, in the reconnection action, the control unit may cause at least one of the signal reception section and the inter-apparatus communication section to enter the first state and the second state.

According to the aspect of the invention with this configuration, the reconnection action allows the same state as in the case where the connection is released and then established again to be readily created.

In the display apparatus according to the aspect of the invention, the control unit may cause the electric power supply section to stop supplying electric power in the first state and cause the electric power supply section to supply electric power in the second state.

According to the aspect of the invention with this configuration, stopping and starting electric power supply allows the same state as in the case where the connection is released and then established again to be achieved.

In the display apparatus according to the aspect of the invention, in the first state, the control unit may make the connection of the signal reception section, the inter-apparatus communication section, and the electric power supply section with the external apparatus electrically open.

According to the aspect of the invention with this configuration, the same state as in the case where the connection is released and then established again can be reliably achieved with the display apparatus wired to the external apparatus.

The display apparatus according to the aspect of the invention may further include a sensing unit configured to sense whether the external apparatus has been connected based on the states of the signal reception section and the inter-apparatus communication section.

According to the aspect of the invention with this configuration, the reconnection action that needs to be performed when the external apparatus is connected to the signal reception section is performed, and unnecessary reconnection action is therefore not performed, resulting in improvement in efficiency.

In the display apparatus according to the aspect of the invention, the control unit may perform the reconnection action based on a result of the sensing performed by the sensing unit.

According to the aspect of the invention with this configuration, after detection of whether the external apparatus has been connected, the reconnection action can be performed as required.

In the display apparatus according to the aspect of the invention, the control unit may perform the reconnection action at the start of action of the display apparatus.

According to the aspect of the invention with this configuration, the control unit temporarily releases the connection to the external apparatus and then establishes it again at the start of action of the display apparatus, whereby a normal connection state is achieved.

In the display apparatus according to the aspect of the invention, the control unit may perform the reconnection action when the display apparatus is powered on and starts operating.

According to the aspect of the invention with this configuration, the control unit temporarily releases the connection to the external apparatus and then establishes it again when the display apparatus is powered on, whereby a normal connection state is achieved.

The display apparatus according to the aspect of the invention may further include an input unit configured to detect an input, and the control unit may perform the reconnection action in accordance with the input detected by the input unit.

According to the aspect of the invention with this configuration, the reconnection action is performed according to the input, whereby normal connection to the external apparatus can be achieved.

Another aspect of the invention relates to a method for controlling a display apparatus that includes a connection unit connected to an external apparatus and displays an image based on a signal received by the connection unit, the method including performing reconnection action of causing the connection unit to enter a first state in which it is recognized that the external apparatus has not been connected to the connection unit and then causing the connection unit to enter a second state in which it is recognized that the external apparatus has been connected to the connection unit.

According to the aspect of the invention, the display apparatus that receives an image signal and a control signal from an external apparatus can perform the reconnection action to achieve the same state as in a case where the connection is released and established again. Therefore, for example, in the case of an apparatus that is wired to an external apparatus with a cable so that the connection therebetween is detectable, the same effect as in a case where the cable is disconnected and reconnected can be provided. As a result, when the connection detection fails or when the connection becomes unstable, a normal connection state can be restored without user's operation.

According to the aspects of the invention, the same state as in a case where the user manually releases the connection and establishes the connection again can be created to achieve a normal connection state.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment to which the invention is applied will be described below with reference to the drawings.

Figure 1:
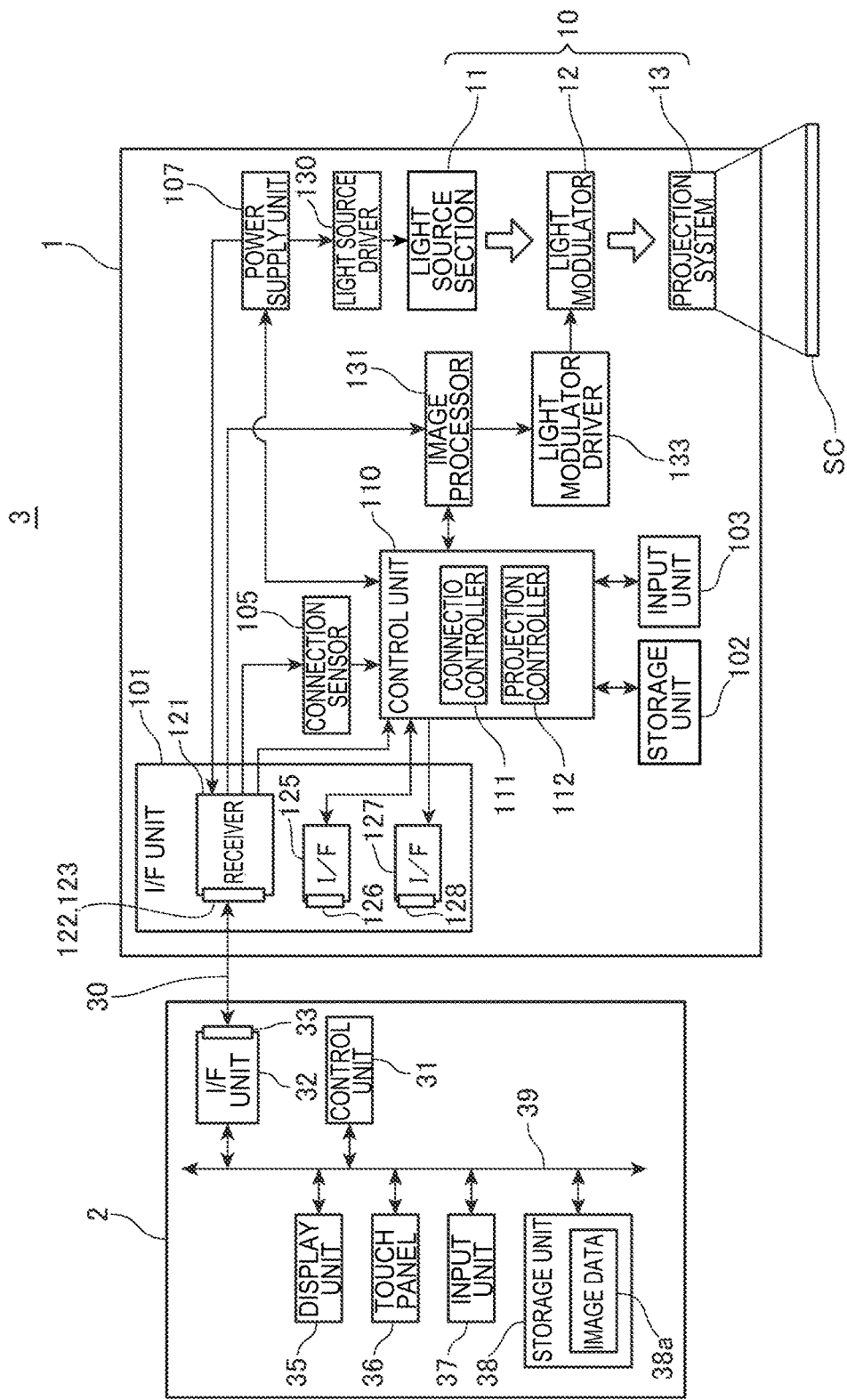
FIG. 1 is a block diagram showing the configuration of a projection system.

FIG. 1 is a block diagram showing the configuration of a projection system 3 according to the embodiment. The projection system 3 includes a projector 1 and a mobile terminal 2 connected to each other, as shown in FIG. 1.

The projector 1 is a display apparatus that is connected to an external image supply apparatus, such as a personal computer and a variety of video players, and projects and displays an image based on input image data inputted from the image supply apparatus on an object on which the projection is performed. Examples of the image supply apparatus may include a video reproduction apparatus, a DVD (digital versatile disk) reproduction apparatus, a television tuner apparatus, a CATV (cable television) set top box, a video output apparatus, such as a video game console, and a personal computer. In the present embodiment, the mobile terminal 2 functions as the image supply apparatus that supplies the projector 1 with an image. The projector 1 and the mobile terminal 2 are wired with a cable 30.

Further, in the present embodiment, the projector 1 projects an image on a screen SC by way of example, but the object on which the projection is performed may be a flat surface, such as a wall surface, or a stereoscopic object having a curved surface.

The projector 1 includes a projection unit 10 (display unit), which forms an optical image, and an image processing system that electrically processes the image displayed by the projection unit 10.

The projection unit 10 will first be described.

The projection unit 10 includes a light source section 11, a light modulator 12, and a projection system 13.

The light source section 11 includes a light source formed of a lamp, such as a xenon lamp and an ultrahigh-pressure mercury lamp, or a solid-state light source, such as an LED (light emitting diode) and a laser light source. A light source driver 130 is connected to the light source section 11, and the light source driver 130 supplies, for example, electric power or a pulse signal that turns on the light source.

The light source section 11 may further include a reflector (not shown) and an auxiliary reflector (not shown) that guide light emitted from the light source to the light modulator 12. The light source section 11 may still further include a group of lenses (not shown) for enhancing optical characteristics of projection light, a polarizer (not shown), or a light attenuation element (not shown) that is disposed in a position on the path to the light modulator 12 and attenuates the light emitted from the light source. The light source section 11 may still further include an optical part (not shown) that separates the light emitted from the light source into three color light fluxes or R, G, and B light fluxes.

The light modulator 12 modulates the three color light fluxes or the R, G, and B light fluxes separated from the light outputted from the light source section 11. The light modulator 12 is configured based, for example, on a method using three transmissive or reflective liquid crystal light valves corresponding to the RGB light fluxes or a method using three digital mirror devices. The light modulator 12 may instead employ a DMD method in which a color wheel that sequentially transmits RGB light fluxes contained in white light emitted from a light source and a single digital mirror device (DMD) are combined with each other. In the present embodiment, the light modulator 12 includes three liquid crystal light valves corresponding to the three color light fluxes or the R, G, and B light fluxes by way of example. In this case, the light modulator 12 includes reflective liquid crystal panels each having a plurality of pixels arranged in a matrix, and the plurality of pixels form an image that modulates the light emitted from the light source. The light modulator 12 is driven by a light modulator driver 133, which will be described later, and changes optical transmittance at each of the pixels arranged in a matrix to form an image.

The projection system 13 includes a group of lenses that collect and combine the modulated light fluxes from the light modulator 12 with one another and projects the resultant color image light on the screen SC. The projection system 13 may include a group of lenses including a zoom lens that enlarges and reduces a projected image and performs focus adjustment, mechanisms that move lenses to perform zoom and focus adjustment, and other components. The projector 1 may further include a projection system driver that drives the focus adjustment mechanism and the zoom mechanism.

A main body of the projector 1 accommodates the image processing system, which controls the action of the projector 1 to electrically process an image signal. The image processing system includes a control unit 110, an interface (I/F) unit 101, a storage unit 102, an input unit 103, the light source driver 130, an image processor 131, and the light modulator driver 133.

The control unit 110 includes a CPU (central processing unit), a ROM (read only memory), a RAM (random access memory), and other components that are not shown, and the CPU executes a control program to control the image processing system in the projector 1.

The interface unit 101 is connected to an external image supply apparatus (external apparatus). The interface unit 101 includes a variety of connectors and interface circuits to which digital image data or analog image data is inputted from the image supply apparatus.

The interface unit 101 in the present embodiment includes a receiver 121 (connection unit) and interfaces 125 and 127. The receiver 121 and the interfaces 125 and 127 detect an image signal inputted from the image supply apparatus, receive the image signal, decode the image signal to produce digital image data, and output the digital image data to the image processor 131.

The receiver 121 is an interface that supports a Mobile High-Definition Link ("MHL") (registered trademark) standard and an HDMI (registered trademark) standard. The receiver 121 includes a connector 122 and a connector 123, and the connector 123 supports the HDMI standard. When the mobile terminal 2 is connected to the connector 122 via the cable 30, the receiver 121 receives an image signal in the MHL format transmitted from the mobile terminal 2, transmits and receives control signals, and supplies the mobile terminal 2 with electric power having a predetermined voltage. When the image supply apparatus is connected to the connector 123 via the cable, the receiver 121 receives an image signal transmitted from the image supply apparatus. The function of the receiver 121 will be described later.

The interfaces 125 and 127 include connectors 126 and 128, respectively, which can be connected to the image supply apparatus (not shown) via cables (not shown). The interfaces 125 and 127 include the connectors 126 and 128 and interface circuits that comply with a communication interface standard and an image input interface standard. The communication interface may, for example, be a wired LAN, IEEE 1394, and a USB. The image input interface may, for example, be DisplayPort (trademark) and CoaXPress (trademark). The interface unit 101 may further include a wireless communication interface that complies, for example, with a wireless LAN and Bluetooth (registered trademark).

The interface unit 101 selects an input path from those including the receiver 121 and the interfaces 125 and 127 under the control of the control unit 110. The interface unit 101 outputs image data inputted through the selected input path to the image processor 131. The interface unit 101 may output voice data along with the image data.

A connection sensor 105 (sensing unit) is connected to the receiver 121. The connection sensor 105 senses, based on the state of an image signal or a control signal inputted to the receiver 121, that the mobile terminal 2 or any other image supply apparatus has been connected to the receiver 121. The connection sensor 105 is connected to the control unit 110, and the control unit 110 can detect the state of sensing performed by the connection sensor 105.

The light source driver 130 supplies the light source section 11 with electric power or a pulse signal based on the electric power supplied from a power supply unit 107 under the control of the control unit 110. When the light source in the light source section 11 is a lamp, the light source driver 130 controls a voltage and current supplied to the light source section 11 to cause the lamp to emit light. When the light source in the light source section 11 is a discharge tube lamp, the light source section 11 functions as a ballast.

When the light source in the light source section 11 is a solid-state light source, the light source driver 130 supplies the light source section 11 with DC current and generates and outputs a pulse signal for performing PWM control on the luminance of the solid-state light source under the control of the control unit 110.

Further, the light source driver 130 causes the light source section 11 to emit light and stop emitting light under the control of the control unit 110.

The power supply unit 107 is connected to a commercial power supply external to the projector 1 (AC power supply that provides 100 to 240 V, for example) and supplies the portions in the projector 1 with electric power. The power supply unit 107, for example, outputs 3.3-V, 5-V, or 12-V DC current for operating ICs in the image processing system in the projector 1. The power supply unit 107 further supplies the light source driver 130 with electric power for turning on the light source.

The image processor 131 processes the image data inputted from the interface unit 101 and outputs an image signal to the light modulator driver 133 under the control of the control unit 110. Examples of the processes carried out by the image processor 131 include resolution conversion, frame rate conversion, 3D image conversion, distortion correction, zooming, color tone correction, and luminance correction.

The light modulator driver 133 draws an image on each of the liquid crystal light valves in the light modulator 12 based on the image signal inputted from the image processor 131.

The storage unit 102 and the input unit 103 are connected to the control unit 110.

The storage unit 102 is a nonvolatile device that stores for example, a program executed by the CPU (not shown) provided in the control unit 110 and data processed by the control unit 110. For example, the storage unit 102 stores values set in a variety of processes carried out by the image processor 131, tables to which the control unit 110 and the image processor 131 refer, and other types of information. The storage unit 102 may instead store image data, and the control unit 110 may read the image data and project it on the screen SC.

The input unit 103 detects operation performed on a remote control (not shown) through which the projector 1 is operated and operation performed on an operation panel (not shown) provided in the main body of the projector 1. The input unit 103 receives and decodes a wireless signal transmitted from the remote control and detects operation performed on the remote control. The input unit 103 further senses operation performed on a button of the operation panel. The input unit 103 generates operation data corresponding to the operation performed on the remote control or the operation panel and outputs the operation data to the control unit 110.

The input unit 103 further controls turning on and off of an indicator lamp on the operation panel in accordance with the states in which the projector 1 is operated and set and under the control of the control unit 110.

The control unit 110 includes a connection controller 111 (control unit) and a projection controller 112 and controls the action of the projector 1.

The connection controller 111 controls the interface unit 101 to select an input path through which an image input is accepted from the receiver 121 or the interface 125 or 127. The interface unit 101 outputs image data through the input path selected by the connection controller 111 to the image processor 131.

The connection controller 111 further has a connection detection function of detecting whether the connector 122 or 123 is connected. The connection detection function allows the connection controller 111 to detect that the image supply apparatus has been connected to the receiver 121 based on a result of the sensing performed by the connection sensor 105. In this case, the connection controller 111 transmits and receives control data to and from the image supply apparatus connected to the receiver 121 for negotiation (hand shaking). In the negotiation, the connection controller 111 and the image supply apparatus transmit and receive data representing a vender and the type of apparatus and data on the resolution and the frame rate of transmittable and receivable digital image data, and other types of data. The connection controller 111 then selects the receiver 121 as the input path and causes the receiver 121 to output image data inputted from the image supply apparatus to the receiver 121 to the image processor 131.

When the connection controller 111 detects based on a result of the sensing performed by the connection sensor 105 that the image supply apparatus has been connected to the receiver 121, the connection controller 111 can perform reconnection action in which the connection is temporarily released and then established again. The reconnection action will be described later.

The projection controller 112 controls image projection action based on the operation data inputted from the input unit 103. That is, the projection controller 112 controls the light source driver 130, the light modulator driver 133, and the image processor 131 to cause the projection unit 10 to project an image on the screen SC.

On the other hand, the mobile terminal 2 includes a control unit 31, an interface unit 32, a display unit 35, an input unit 37, and a storage unit 38, which are connected to each other via a bus 39.

The mobile terminal 2 is a mobile terminal device having a compact main body that accommodates the units described above. Specific examples of the mobile terminal 2 include a variety of mobile communication terminal devices including a portable player, a smartphone, and a mobile phone each of which reproduces video images and voices. The mobile terminal 2 may include a loudspeaker for voice output. When the mobile terminal 2 is a communication terminal, the mobile terminal 2 may further include a microphone for voice input, a voice processor that processes a voice signal inputted through the microphone and a voice signal to be outputted to the loudspeaker, a communication module that transmits and receives data in the form of a wireless signal, and other components as well as the configuration shown in FIG. 1.

The mobile terminal 2 includes a touch panel 36, which is formed of a liquid crystal display panel, an organic EL panel, or any other display panel to which a touch sensor that detects touch operation is assembled. Any of a variety of touch sensors based, for example, on electrostatic capacitance, an ultrasonic wave, pressure sensing, a resistive film, and optical sensing can be used in the touch panel 36.

The display unit 35 displays an image on the touch panel 36 based on display data inputted from the control unit 31. The input unit 37 detects touch operation performed on the touch panel 36 and outputs data representing the position where the operation has been performed to the control unit 31.

The interface unit 32 includes a connector 33 and can transmit image data to an external apparatus via a cable connected to the connector 33. The interface unit 32 in the present embodiment is an interface that supports the MHL standard and typically includes a MicroUSB connector 33. When the projector 1 is connected to the connector 33 via the cable 30, the interface section 32 negotiates with the projector 1, encodes the image data to generate an image signal, and outputs the image signal through the connector 33.

The storage unit 38 stores a program and data in a nonvolatile semiconductor storage device or any other nonvolatile storage device. The storage unit 38 stores an application program executed by a CPU in the control unit 31 and data processed by the CPU. In the present embodiment, the storage unit 38 stores image data 38a. The image data 38a is video image (motion image) data and can be reproduced and displayed on the touch panel 36 under the control of the control unit 31. The control unit 31 can transmit the image data 38a to an external apparatus, as will be described later.

The control unit 31 includes the CPU, a ROM, a RAM, and other components that are not shown and executes a control program stored in the ROM to control the mobile terminal 2. The control unit 31 executes the application program stored in the storage unit 38 in accordance with data inputted through the input unit 37. The control unit 31 generates data for screen display based on a result of the execution of the program and an input placed through the touch panel 36 and outputs the data to the display unit 35.

When the control unit 31 is instructed to transmit the image data 38a stored in the storage unit 38 in accordance with operation performed on the touch panel 36, the control unit 31 reads the image data 38a and transmits it through the interface unit 32.

Figure 2A:
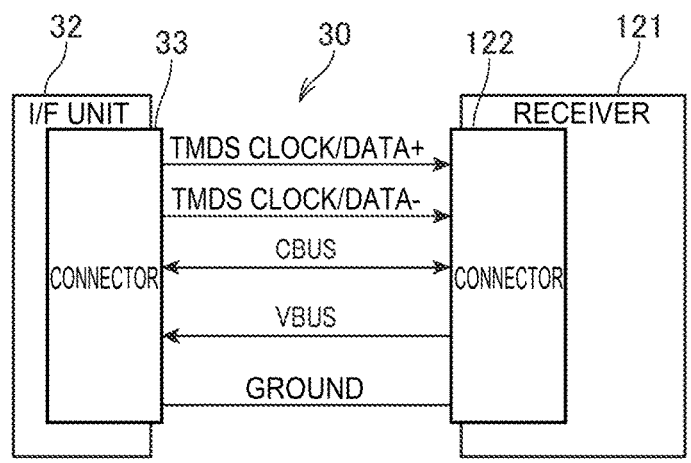
FIGS. 2A and 2B are descriptive diagrams showing connection between a projector and a mobile terminal.
Figure 2B:
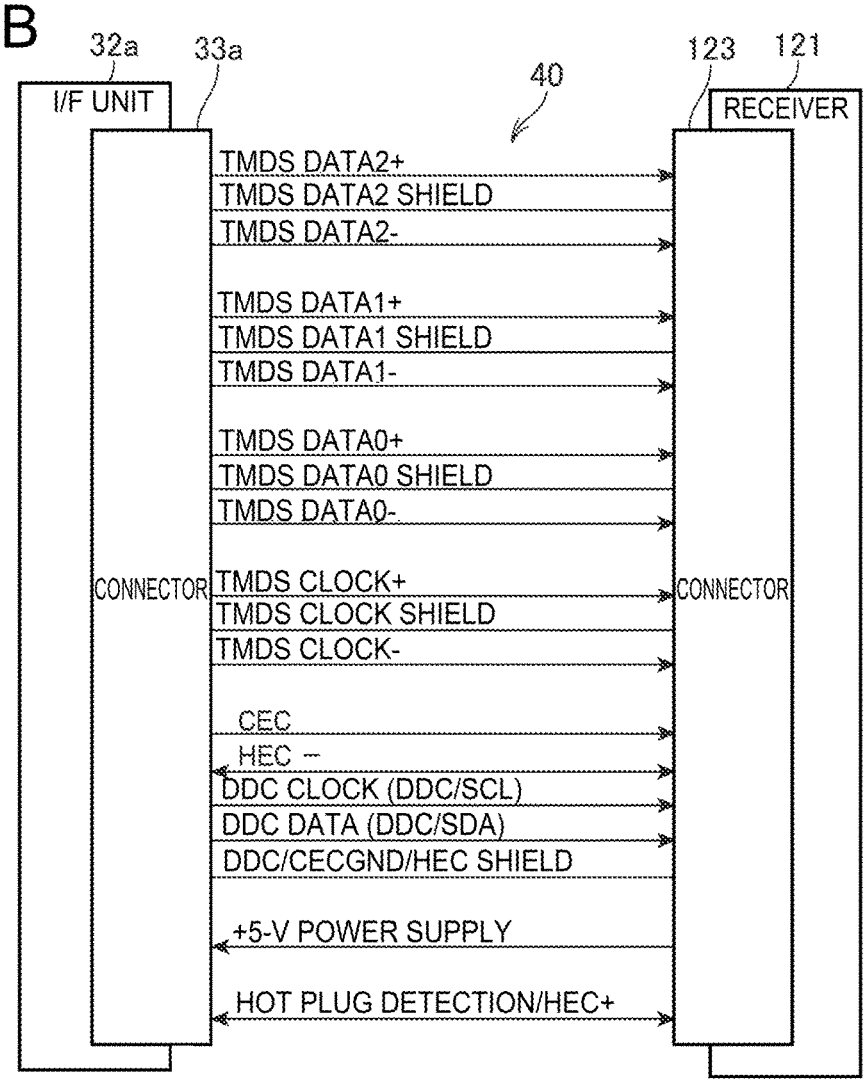

FIGS. 2A and 2B are descriptive diagrams showing connection between the projector 1 and an external apparatus. FIG. 2A shows a case where the projector 1 and the mobile terminal 2 are connected to each other in compliance with the MHL standard, and FIG. 2B shows a case where an external apparatus is connected to the projector 1 in compliance with the HDMI standard.

The connector 122 provided in the projector 1 and the connector 33 in the mobile terminal 2 employ the MHL standard. The interface unit 32 functions as an MHL transmitter and sends image data that complies with the MHL standard. The receiver 121 functions as an MHL receiver. The cable 30, which connects the connector 33 and the connector 122 to each other, has five transfer lines in compliance with the MHL standard, as shown in FIG. 2A. In detail, the five transfer lines include TMDS (transition minimized differential signaling) differential lines (TMDS clock/data+ line, TMDS clock/data− line), CBUS that transfers a control signal, VBUS that supplies electric power, and a ground line. CBUS is responsible for transmission/reception of an image signal via the cable 30 and is a bus through which the projector 1 and the mobile terminal 2 transmit and receive control signals to and from each other. VBUS is an electric power line through which the projector 1 supplies the mobile terminal 2, for example, with 5-V DC current.

The receiver 121 also functions as an HDMI receiver and can be connected to an external apparatus including a connector and an interface circuit that accord with the HDMI standard. FIG. 2B shows a case where an external apparatus having an interface unit 32a and a connector 33a, which accord with the HDMI standard, is connected to the connector 123 in the receiver 121 with a cable 40.

The cable 40 has transfer lines defined in the HDMI standard. In detail, the cable 40 has differential data lines and shields for TMDS data channels 0, 1, and 2 (TMDS data+ lines, TMDS data− lines, TMDS data shields) and TMDS clocks (TMDS clock+ line, TMDS clock− line, TMDS clock shield). The cable 40 further has a CEC (consumer electronics control) line, an HEC (HDMI Ethernet (registered trademark) channel) line, and a DDC (display data channel) line. In more detail, they are an HEC+ line, an HEC− line, a DDC clock line, a DDC data line, an HEC shield line, and other lines. The cable 40 further has an electric power line through which the projector 1 supplies the external apparatus, for example, with 5-V DC current. An HEC+ line is also used as a hot plug detection line, and an HEC shield line is also used as a DDC/CEC ground line.

When the receiver 121 is connected to an external apparatus that functions as an HDMI source apparatus via the cable 40, the receiver 121 operates as an HDMI sync apparatus and receives image data.

Figure 3:
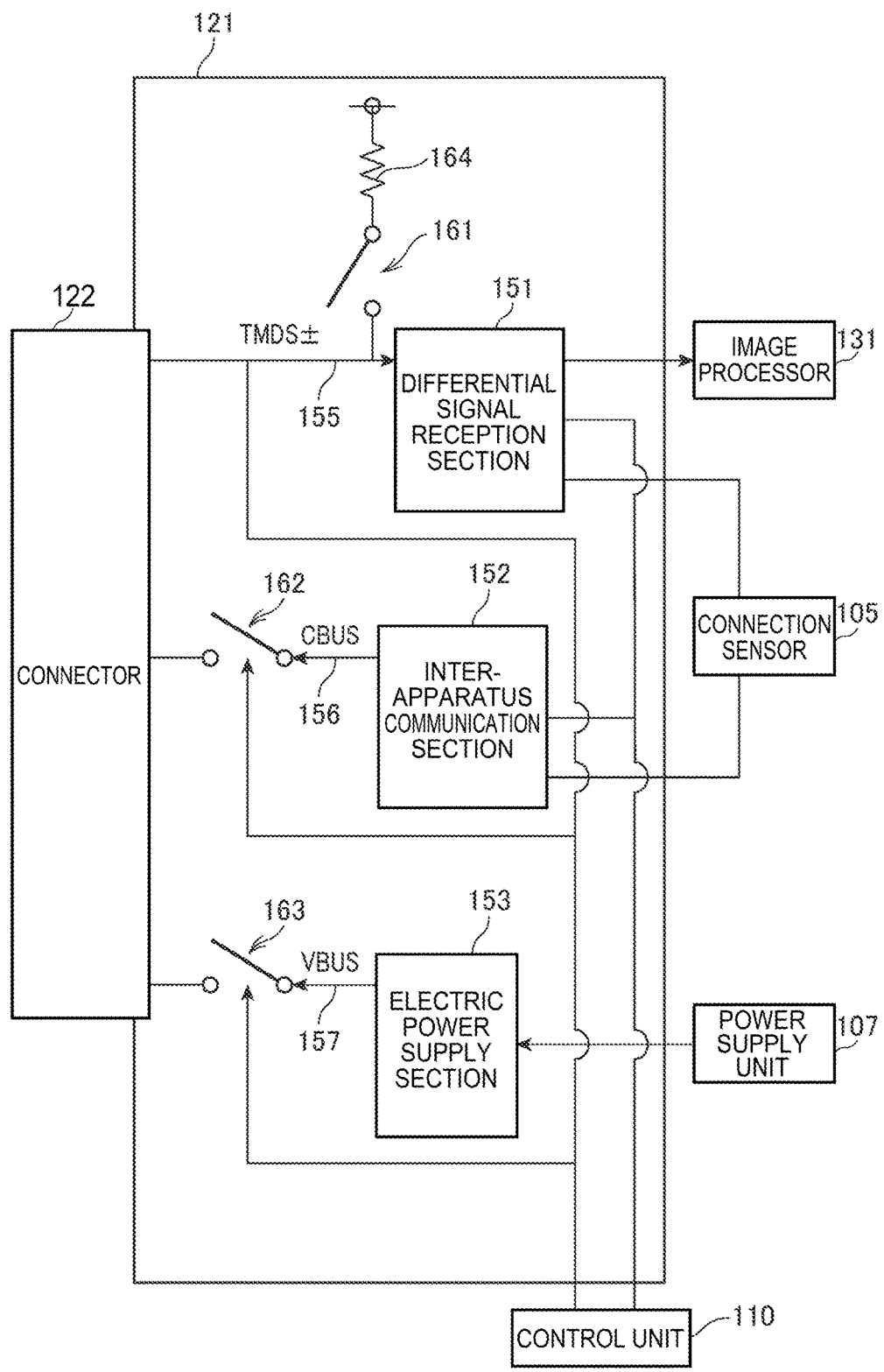
FIG. 3 is a descriptive diagram showing the configuration of a receiver in detail.

FIG. 3 is a descriptive diagram showing the configuration of the receiver 121 in detail.

FIG. 3 shows connection between the connector 122 and an internal circuit of the receiver 121.

The receiver 121 includes a differential signal reception section 151, which receives image data via the TMDS clock/data+ line and the TMDS clock/data− line. The differential signal reception section 151 is connected to a TMDS clock/data+ terminal and a TMDS clock/data− terminal of the connector 122 via a TMDS clock/data line 155. The TMDS clock/data line 155 is actually formed of two lines, the TMDS clock/data+ line and the TMDS clock/data− line, but is drawn as a single line in FIG. 3 for ease of understanding. The differential signal reception section 151 decodes an image signal received through the TMDS clock/data line 155 and outputs the decoded image signal to the image processor 131.

The TMDS clock/data line 155 is provided with a switch 161, which is opened and closed under the control of the control unit 110. The switch 161 connects one end of a TMDS terminal resistor 164, the other end of which is connected to a terminal power supply, to the TMDS clock/data line 155 between the differential signal reception section 151 and the connector 122. When the switch 161 is open, the terminal of the TMDS clock/data line 155 that is connected via the resistor 164 is ineffective. In this state, the TMDS data+ terminal and the TMDS data− terminal of the connector 122 are electrically in a high impedance state. When the switch 161 is closed, the terminal of the TMDS clock/data line 155 is effective and allows reception of an image signal.

The receiver 121 includes an inter-apparatus communication section 152, which transmits and receives control signals. The inter-apparatus communication section 152 is connected to a CBUS terminal of the connector 122 via CBUS 156. The inter-apparatus communication section 152 transmits and receives control signals between the CBUS 156 and the control unit 110 and performs decoding and encoding.

The connection sensor 105 is connected to the differential signal reception section 151 and the inter-apparatus communication section 152. The connection sensor 105 senses whether or not the differential signal reception section 151 and the inter-apparatus communication portion 152 have been connected to an MHL transmitter and outputs a result of the sensing to the control unit 110. The control unit 110 thus detects connection of an MHL transmitter to the connector 122.

CBUS 156 is provided with a switch 162, which is opened and closed under the control of the control unit 110. When the switch 162 is open, the inter-apparatus communication section 152 and the connector 122 are electrically open with each other, and the CBUS terminal of the connector 122 is in a high impedance state. When the switch 162 is closed, the inter-apparatus communication section 152 is connected to the connector 122 and can transmit and receive control signals.

The receiver 121 further includes an electric power supply section 153. The electric power supply section 153 supplies the connector 122, for example, with 5-V DC current through VBUS 157 based on the electric power supplied from the power supply unit 107. VBUS 157 is provided with a switch 163, which is opened and closed under the control of the control unit 110. When the switch 163 is open, the electric power supply section 153 and the connector 122 are electrically insulated from each other, and a VBUS terminal of the connector 122 is grounded. When the switch 163 is closed, the electric power supply section 153 and the connector 122 are electrically connected to each other, and the DC current is supplied.

As well known, TMDS (transition minimized differential signaling) is a transfer method employed commonly in the HDMI standard and the MHL standard, and the receiver 121 can be implemented as an MHL/HDMI receiver IC that supports both the HDMI and MHL standards. Instead, the receiver 121 may be configured as an SoC (system-on-a-chip) device along with the interfaces 125 and 127 and the control unit 110, and the thus configured receiver 121 may be implemented as an MHL/HDMI receiver core. For example, the differential signal reception section 151 and the inter-apparatus communication section 152 can be implemented as a single IC or a single core. In this case, the switches 161 and 162 are switches in the IC or the core. When the electric power supply section 153 is provided separately from the IC or the core described above, the switch 163 may be an independent switch controlled by the control unit 110. Each of the switches 161, 162, and 163 can be formed of a switching device, a circuit including a switching device, or a circuit that functions in the same manner as a switching device or can even be a physical switch.

The connection controller 111 provided in the control unit 110 controls the receiver 121 based on a result of the sensing performed by the connection sensor 105 to switch the action mode of the receiver 121 (between HDMI mode and MHL mode). That is, when an MHL transmitter is connected to the connector 122, the receiver 121 is operated in the MHL mode, whereas when an HDMI source apparatus is connected to the connector 123, the receiver 121 is operated in the HDMI mode. The switching is achievable by the function of the connection controller 111 that detects whether the connector 122 or 123 is connected.

Further, when the mobile terminal 2 is connected to the projector 1 via the cable 30, the mobile terminal 2 detects the connection based on the voltages at CBUS and VBUS. In the mobile terminal 2, the interface unit 32 detects the connection, and the control unit 31 performs the action to be performed at the time of the connection detection.

As a result, the projector 1 and the mobile terminal 2 connected to each other via the cable 30 transmit and receive control signals to and from each other, perform MHL negotiation, and enter an image data transmittable/receivable state.

In the negotiation, data representing a vender and the type of apparatus and data on the resolution and the frame rate of transmittable and receivable digital image data, and other types of data are transmitted and received between the projector 1 and the mobile terminal 2 according to the protocol defined by the MHL standard. The connection controller 111 and the control unit 31 can perform the negotiation. The negotiation may instead be performed based on the functions of the receiver 121 and the interface unit 32.

With the mobile terminal 2 connected to the connector 122 via the cable 30, the connection controller 111 can temporarily release the connection and then establishes the connection again (reconnection action).

Specifically, the connection controller 111 opens the switches 161, 162, and 163 to achieve a state in which the TMDS clock/data line 155, CBUS 156, and VBUS 157 are electrically open. The state is called a first state. In the first state, the receiver 121 is connected to the mobile terminal 2 via the cable 30, but the signal lines (TMDS clock/data line 155, CBUS 156) and the electric power line (VBUS 157) are disconnected. The differential signal reception section 151, the inter-apparatus communication section 152, and the electric power supply section 153 are therefore in a state in which as if the mobile terminal 2 were not connected.

The connection controller 111 then closes the switches 161, 162, and 163 to cause the TMDS clock/data line 155, CBUS 156, and VBUS 157 to be in a connected state. The state is called a second state. In the second state, the receiver 121 and the mobile terminal 2 are connected to each other via the signal lines (TMDS clock/data line 155, CBUS 156) and the electric power line (VBUS 157).

When the connection controller 111 performs the reconnection action, the mobile terminal 2 operates in the same manner as in a case where the projector 1 is temporarily disconnected and then reconnected. When the connection controller 111 changes the state of the receiver 121 to the first state, the control unit 31 recognizes that the projector has been disconnected because no control signals are transmitted or received via CBUS of the cable 30 or no electric power is supplied via VBUS. Since the projector 1 is not connected, the control unit 31 discards data on the apparatus connected to the interface unit 32 and enters a standby state in which the control unit 31 waits until an apparatus is connected to the interface unit 32.

Thereafter, when the connection controller 111 changes the state of the receiver 121 to the second state, CBUS in the receiver 121 is connected to the mobile terminal 2 and current is supplied through VBUS. The control unit 31 detects that the interface unit 32 has been newly connected to the projector 1 based on at least one of the states (voltage, for example) of CBUS and VBUS. The control unit 31, specifically, the interface unit 32 negotiates with the apparatus connected via the cable 30, that is, the projector 1.

As described above, when the connection controller 111 performs the reconnection action, the connection between the projector 1 and the mobile terminal 2 is temporarily released and then established again. The action provides the same advantageous effect as that provided when a user who uses the projection system 3 disconnects the cable 30 and then connects the cable 30 again.

When the disconnection and the reconnection of the cable 30 are performed, problems with the action of the projection system 3 are solved in many cases. Specifically, if the negotiation between the projector 1 and the mobile terminal 2 is incomplete, resolution or other attributes of an image to be transferred may not coincide on both sides, clocks are shifted from each other on both sides, or other types of discrepancy occur, resulting in incorrect transmission/reception of image data in some cases. Such states may occur even when the projector 1 or the mobile terminal 2 is not defective, and redoing the negotiation from the beginning is effective in restoration of a normal state. For example, when the projector 1 is not energized but the cable 30 is connected thereto, and the projector 1 is then powered on, incomplete negotiation is performed in some cases.

To address the problem described above, when the projector 1 is powered on, the connection controller 111 performs the reconnection action. As a result, even when the cable 30 has already been connected to the projector 1 when the projector 1 is powered on, redoing the negotiation achieves complete negotiation.

Figure 4:
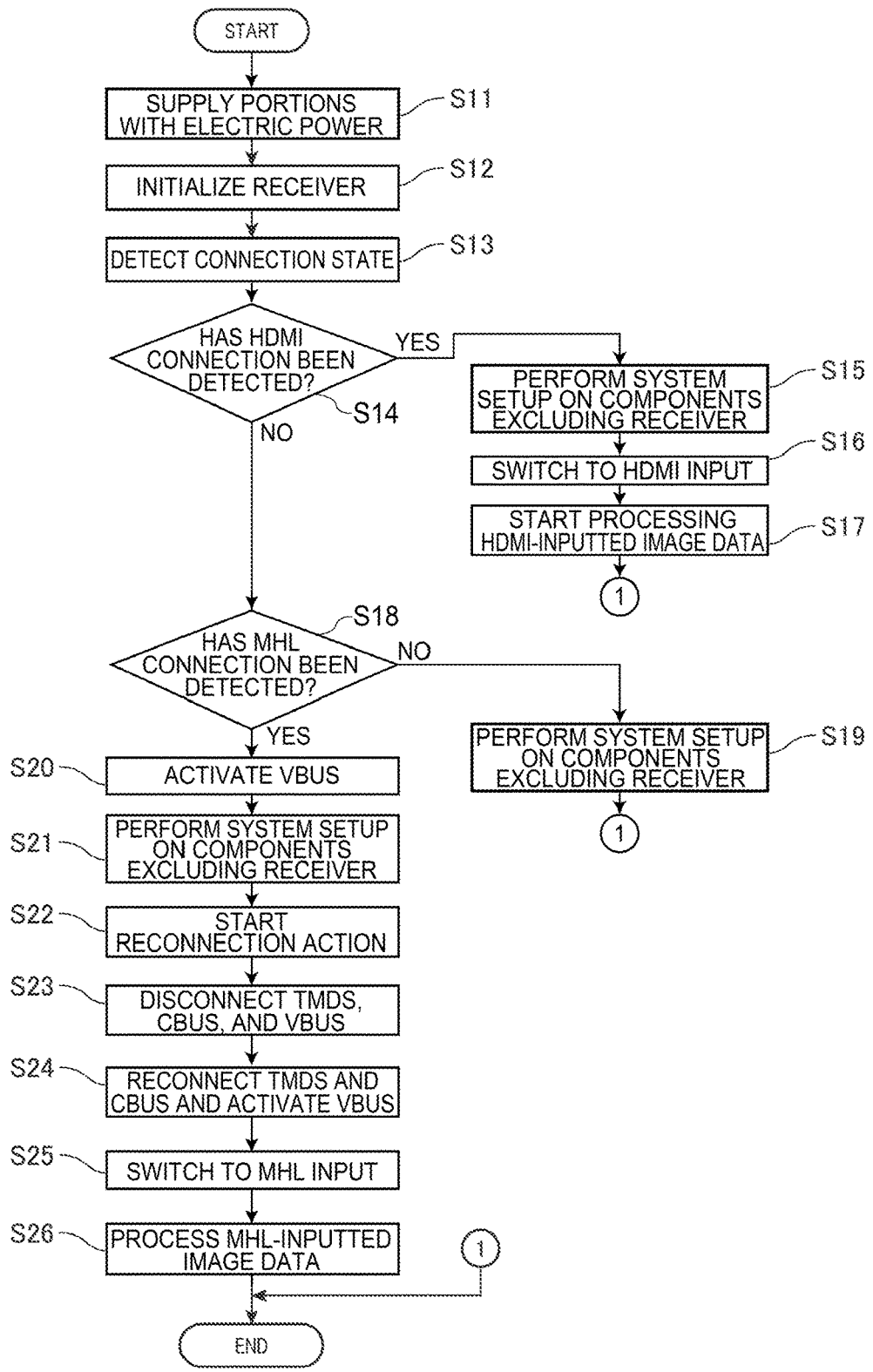
FIG. 4 is a flowchart showing the action of the projector.

FIG. 4 is a flowchart showing the action of the projector 1, in particular, the action of the control unit 110 after the projector 1 is powered on.

When the operation panel or the remote control is operated and issues an instruction to power the projector 1 on and the input section 103 detects the instruction and causes the projector 1 to be powered on, the control unit 110 starts a startup sequence. That is, the control unit 110 starts the power supply unit 107, and the power supply unit 107 supplies the portions in the projector 1 with electric power (step S11). The control unit 110 that is performing the startup sequence initializes the receiver 121 (step S12).

After the startup sequence that starts the projector 1 is performed or during the startup sequence but after the receiver 121 is initialized, the connection controller 111 detects the connection state of the receiver 121 based on a result of the sensing performed by the connection sensor 105 (step S13).

The connection controller 111 evaluates whether or not the receiver 121 has been connected to an external apparatus via the connector 123 (step S14). As described above, the receiver 121 is a receiver that complies with both the HDMI standard and the MHL standard and can distinguish among the MHL connection, the HDMI connection, and no connection based on a result of the sensing performed by the connection sensor 105.

When a result of the evaluation shows that an external apparatus has been connected to the receiver 121 in HDMI (Yes in step S14), the control unit 110 performs system setup action, such as initialization of the projection unit 10 and the image processing system in the projector 1 excluding the receiver 121 to establish a state in which an inputted image signal is ready to be projected via the projection unit 10 (step S15), and the connection controller 111 controls the receiver 121 to cause it to switch the action mode thereof to the HDMI mode (step S16). The receiver 121 then receives an image signal inputted through the connector 123 and outputs image data to the image processor 131 (step S17). The projection controller 112 controls the projection unit 10 and the image processor 131 to cause the projection unit 10 to project an image based on the image data inputted from the receiver 121 to the image processor 131. The connection controller 111 completes the projector action procedure.

On the other hand, when a result of the evaluation shows that no external apparatus that complies with the HDMI standard has been connected to the receiver 121 (No in step S14), the connection controller 111 evaluates whether or not the receiver 121 has been connected to an external apparatus via the connector 122 (step S18). That is, the connection controller 111 evaluates whether or not the receiver 121 has been connected to an external apparatus in MHL.

When a result of the evaluation shows that no external apparatus has been connected to the receiver 121 (No in step S18), only the system setup action is performed as in step S15 (step S19), and the connection controller 111 terminates the projector action procedure.

When a result of the evaluation shows that an external apparatus has been connected to the receiver 121 in MHL (Yes in step S18), the connection controller 111 closes the switch 163 to start supplying VBUS 157 with DC current (step S20) and performs the system setup action as in step S15 to achieve the state in which an inputted image signal is ready to be projected via the projection unit 10 (step S21). The connection controller 111 then starts the reconnection action of reconnecting the receiver 121 (step S22). In the reconnection action, the connection controller 111 opens the switches 161 and 162 to achieve no conduction through the TMDS clock/data line 155 and the CBUS 156 (step S23). In step S23, the switch 163 may also be opened.

After a preset period has elapsed since the switches 161 and 162 were opened, the connection controller 111 closes the switches 161 and 162 (step S24). When the switch 163 has been opened in step S23, the switch 163 is closed in step S24. Further, the connection controller 111 controls the electric power supply section 153 to cause it to start supplying VBUS 157 with DC current.

The reconnection action is performed after step S21 primarily for avoidance of connection failure that tends to be induced by ignition noise produced when the light source driven with a high voltage is turned on in the initialization of the projection unit 10 performed in step S21. In addition, the system setup action (step S15) is performed after the connection detection in step S13 for reduction in the period from the system startup to the projection of an inputted image signal through early performance of the connection detection. When the system configuration of the projector 1 does not raise the concerns described above, the processes in step S15, S19, and S21 may be carried out in step S12 at the same time.

The connection controller 111 controls the receiver 121 to change the state of the receiver 121 to the MHL mode (step S25). The receiver 121 then receives an image signal inputted through the connector 122 and outputs image data to the image processor 131 (step S26). The projection controller 112 controls the projection unit 10 and the image processor 131 to cause the projection unit 10 to project an image based on the image data inputted from the receiver 121 to the image processor 131. The connection controller 111 then completes the projector action procedure.

When the projection is initiated in step S17 or S26 and the projector action procedure in FIG. 4 is completed, the projection controller 112 keeps the image projection performed by the projection unit 10. When the projector action procedure in FIG. 4 is terminated in step S19, the connection controller 111 enters a standby state in which the connection controller 111 waits until the cable 30 or 40 is connected to the connector 122 or 123.

In the example shown in FIG. 4, the description has been made of the case where after the projector 1 is powered on, the connection of the receiver 121 is detected and the reconnection action is performed when the MHL connection has been detected. The connection controller 111 may instead perform the reconnection action (steps S18, S22 to S26 in FIG. 4) when an instruction to perform the reconnection action is issued by operation performed on the operation panel or the remote control. In this case, the user can cause the connection controller 111 to perform the reconnection action at arbitrary timing to redo the negotiation without disconnecting and reconnecting the cable 30.

As described above, in the embodiment to which the invention is applied, the projector 1, which is connected to the mobile terminal 2 to form the projection system 3, includes the receiver 121 and the connection controller 111. The receiver 121 is connected to the mobile terminal 2 and receives an image signal and a control signal from the mobile terminal 2. The connection controller 111 performs the reconnection action, in which the connection controller 111 changes the state of the receiver 121 to the first state, which causes the connection controller 111 to recognize that the mobile terminal 2 has not been connected to the receiver 121, and then changes the state of the receiver 121 to the second state, which causes the connection controller 111 to recognize that the mobile terminal 2 has been connected to the receiver 121. Performing the reconnection action can thus achieve the same state as in a case where the connection is released and established again. Therefore, for example, in the case of an apparatus that is wired to the mobile terminal 2 with a cable so that the connection therebetween is detectable, the same effect as in a case where the cable is disconnected and reconnected can be provided. As a result, when the connection detection fails or when the connection becomes unstable, a normal connection state can be restored without user's operation.

The receiver 121 has the differential signal reception section 151, which receives an image signal, the inter-apparatus communication section 152, which communicates with the mobile terminal 2 and transmits and receives signals, and the electric power supply section 153, which supplies the mobile terminal 2 with electric power. That is, in the projector 1, which has functions of transmitting and receiving signals to and from the mobile terminal 2 and supplying the mobile terminal 2 with electric power, when the connection detection fails or when the connection becomes unstable, a normal connection state can be quickly restored. Further, the differential signal reception section 151 can receive an image signal and a voice signal.

The connection controller 111 changes the state of at least one of the differential signal reception section 151 and the inter-apparatus communication section 152 to the first and second states in the reconnection action to readily create the same state as in the case where the connection is released and established again.

Further, the connection controller 111 can stop the electric power supply from the electric power supply section 153 in the first state and allow the electric power supply section 153 to supply electric power in the second state to achieve the same state as in the case where the connection is released and then established again.

Further, since the connection controller 111 makes the connection of the differential signal reception section 151, the inter-apparatus communication section 152, and the electric power supply section 153 with the cable 30 electrically open in the first state, the same state as in the case where the connection is released and then established again can be reliably achieved with the receiver 121 wired to the mobile terminal 2.

Further, since the connection sensor 105, which senses whether the mobile terminal 2 is connected based on the states of the differential signal reception section 151 and the inter-apparatus communication section 152, is provided, the reconnection action that needs to be performed when an external apparatus is connected to the receiver 121 can be performed. Unnecessary reconnection action is therefore not performed, resulting in improvement in efficiency.

Moreover, since the connection controller 111 performs the reconnection action based on a result of the detection of the connection state of the receiver 121, the reconnection action can be performed as required.

Further, the connection controller 111, which performs the reconnection action at the start of action of the projector, temporarily releases the connection to the mobile terminal 2 and then establishes it again at the start of action of the projector when the negotiation tends to be incomplete, whereby the action of the projector is allowed to start in a definitely normal connection state. For example, the connection controller 111 performs the reconnection action when the projector 1 having been powered off is powered on and the portions in the projector 1 start operating in response to the power-on operation. The reconnection action may instead be performed when the projector 1 to which electric power is fed but which is not in operation returns to the normal action. The state in which the projector 1 is not in operation is, for example, a power-saving state in which the power consumption is lower than that in the normal action (during image projection, for example). Further, when the projector 1 has a sleep state in which electric power is fed only to part of the projector 1 having not been operated for a fixed period, that is, to portions including the control unit 110 but not to the other portions (such as projection unit 10), the reconnection action may be performed when the projector 1 returns from the sleep state. Further, when the projector 1 has a standby state in which electric power is fed to fewer portions than in the sleep state, the reconnection action may be performed when the projector 1 returns from the standby state.

As a result, before abnormal action occurs, the mobile terminal 2 and the projector 1 can be normally connected to each other, whereby the reliability thereof can be improved.

Further, since the connection controller 111 performs the reconnection action also in accordance with an input detected by the input unit 103, the reconnection action can be performed based on the input.

The embodiment described above is only an example of a specific aspect to which the invention is applied and does not therefore limit the invention, and the invention is also applicable to an aspect different from the embodiment described above. In the above embodiment, the description has been made of the configuration in which the interface unit 32 and the receiver 121 are connected to each other in a method that accords with the MHL standard by way of example, but the invention is not limited to the embodiment described above. The invention is applicable to any configuration in which the control unit 110 can detect that the receiver 121 has been connected to an external apparatus that sends an image signal containing image data or encoded image data. Further, the invention is more preferably applicable to a configuration in which the receiver 121 supplies electric power to an external apparatus that sends an image signal containing image data or encoded image data.

Further, in the above embodiment, the description has been made of the case where the projector 1 is wired to the mobile terminal 2 or any other external apparatus with the cable 30 or 40 by way of example. The invention is, however, not limited to the embodiment described above. For example, the invention is also applicable to a configuration in which the receiver 121 is connected to the mobile terminal 2 or any other external apparatus via a wireless communication device. Specifically, the invention is applicable to a configuration in which the receiver 121 receives image data in a method that accords with WiHD (registered trademark), MIRACAST (registered trademark), or any other wireless communication standard. In this case, the connection controller 111 may perform the reconnection action after detecting that the receiver 121 has been connected to the mobile terminal 2 in wireless communication. In the reconnection action, the connection may be temporarily released, and the receiver 121 may then be connected again to the mobile terminal 2 in the wireless communication.

Further, in the above embodiment, the description has been made of the case where the reconnection action is performed when the projector 1 is powered on and the input unit 103 detects an input, but the invention is not limited to the embodiment described above. For example, a condition under which the reconnection action is performed may be set in advance in the connection controller 111, and the reconnection action may be performed when the connection controller 111 determines that the condition is satisfied based on a result of the sensing performed by the connection sensor 105.

Further, in the above embodiment, the description has been made of the case where all the switches 161, 162, and 163 are opened in the reconnection action. Instead, at least one of the path between the connector 122 and the differential signal reception section 151 and the path between the connector 122 and the inter-apparatus communication section 152 may be disconnected. That is, a state in which the control unit 110 recognizes that the mobile terminal 2 has not been connected only needs to be achieved. It is more preferable that the mobile terminal 2 recognizes that the projector 1 has not been connected to the interface unit 32. Therefore, only at least one of the switches 161 and 162 may be opened. Instead, the switches 161 and 162 may be opened, and the switch 163 may be closed.

In the above embodiment, the description has been made of the case where the interface unit 101 includes the receiver 121 and the interfaces 125 and 126, but the interface unit 101 may only include the receiver 121. Further, the receiver 121 is not limited to an HDMI/MHL receiver and may instead be a functional portion that supports a single method including MHL. Moreover, an external apparatus connected to the projector 1 is not limited to the mobile terminal 2 and may be an image supply apparatus that supplies the projector 1 with image data.

Each of the functional portions in the projection system 3 shown in FIG. 1 represents a functional configuration and is not necessarily implemented in a specific form. That is, hardware corresponding to each of the functional portions is not necessarily implemented, and a single processor that executes a program can, of course, achieve the functions of a plurality of functional portions. Further, part of the functions achieved by software in the embodiment described above may be achieved by hardware, or part of the functions achieved by hardware may be achieved by software. In addition, the specific detailed configuration of each of the other portions in the projection system 3 can be arbitrarily changed to the extent that the change does not depart from the substance of the invention.

What is claimed is:

1. A display apparatus that displays an image, the apparatus comprising:
   a connection unit that supports a Mobile High-Definition Link ("MHL") standard and a High Definition Multimedia Interface ("HDMI") standard and that is connected to an external apparatus and configured to receive an image signal and a control signal from the external apparatus which operates in either the MHL standard or the HDMI standard;
   a display unit configured to display the image based on the image signal received by the connection unit; and
   a control unit configured to set the connection unit to operate in either an MHL mode or an HDMI mode, based on whether an MHL external apparatus or an HDMI external apparatus is connected to the connection unit, and configured to perform, in the MHL mode, a reconnection action of causing the connection unit to enter a first state in which the control unit recognizes that the external apparatus has not been connected to the connection unit and then causing the connection unit to enter a second state in which the control unit recognizes that the external apparatus has been connected to the connection unit,
   wherein
      the connection unit includes a signal reception line configured to receive the image signal, and
      in the reconnection action in the MHL mode, the connection unit is caused to enter the first state by setting the signal reception line to be electrically open and the connection unit is caused to enter the second state by setting the signal reception line to be electrically closed.

2. The display apparatus according to claim 1, wherein the connection unit further includes an inter-apparatus communication line configured to communicate with the external apparatus and to receive the control signal, and an electric power supply line configured to supply the external apparatus with electric power.

3. The display apparatus according to claim 2, wherein in the reconnection action, the control unit causes the connection unit to enter the first state by further setting the inter-apparatus communication line to be electrically open and the connection unit is caused to enter the second state by further setting the inter-apparatus communication line to be electrically closed.

4. The display apparatus according to claim 2, wherein the control unit causes the electric power supply line to stop supplying electric power in the first state and causes the electric power supply line to supply electric power in the second state.

5. The display apparatus according to claim 4, wherein in the first state, the control unit makes the connection of the signal reception line, the inter-apparatus communication line, and the electric power supply line with the external apparatus electrically open.

6. The display apparatus according to claim 2, further comprising
   a sensing unit configured to sense whether the external apparatus has been connected based on the states of the signal reception line and the inter-apparatus communication line.

7. The display apparatus according to claim 6, wherein the control unit performs the reconnection action based on a result of the sensing performed by the sensing unit.

8. The display apparatus according to claim 2, wherein the signal reception line is provided with a first switch, the inter-apparatus communication line is provided with a second switch, and the electric power supply line is provided with a third switch,
   when the connection unit is in the first state, at least the first switch is electrically open, and
   when the connection unit is in the second state, the first switch, the second switch, and the third switch are electrically closed.

9. The display apparatus according to claim 8, wherein when the connection unit is in the first state, the first switch, the second switch, and the third switch are electrically open, and
   when the connection unit is in the second state, the first switch, the second switch, and the third switch are electrically closed.

10. The display apparatus according to claim 1, wherein the signal reception line receives the image signal and a voice signal.

11. The display apparatus according to claim 1, wherein the control unit performs the reconnection action at the start of action of the display apparatus.

12. The display apparatus according to claim 1, wherein the control unit performs the reconnection action when the display apparatus is powered on and starts operating.

13. The display apparatus according to claim 1, further comprising
   an input unit configured to detect an input,
   wherein the control unit performs the reconnection action in accordance with the input detected by the input unit.

14. The display apparatus according to claim 1, wherein the control unit performs the reconnection action after performing a system setup action in which the display apparatus is put into a state in which an inputted image signal is ready to be displayed by the display unit.

15. A method for controlling a display apparatus that includes a connection unit that supports a Mobile High-Definition Link ("MHL") standard and a High Definition Multimedia Interface ("HDMI") standard and that is connected to an external apparatus which operates in either the MHL standard or the HDMI standard, and displays an image based on a signal received by the connection unit, the method comprising setting the connection unit to operate in either an MHL mode or an HDMI mode, based on whether an MHL external apparatus or an HDMI external apparatus is connected to the connection unit, and performing, in the MHL mode, reconnection action of causing the connection unit to enter a first state in which it is recognized that the external apparatus has not been connected to the connection unit and then causing the connection unit to enter a second state in which it is recognized that the external apparatus has been connected to the connection unit, wherein
the connection unit includes a signal reception line configured to receive the image signal, and
in the reconnection action in the MHL mode, the connection unit is caused to enter the first state by setting the signal reception line to be electrically open and the connection unit is caused to enter the second state by setting the signal reception line to be electrically closed.

* * * * *